March 25, 1969 H. PROCHNOW 3,435,356

DRIFT FREE STABILIZED OPERATIONAL AMPLIFIER

Filed Nov. 15, 1965 Sheet 1 of 2

INVENTOR
HORST PROCHNOW

INVENTOR
HORST PROCHNOW

United States Patent Office 3,435,356

Patented Mar. 25, 1969

3,435,356

DRIFT FREE STABILIZED OPERATIONAL AMPLIFIER

Horst Prochnow, Berlin-Lichtenberg, Germany, assignor to Institut fur Regelungstechnik, Berlin, Germany Filed Nov. 15, 1965, Ser. No. 507,955
Int. Cl. H03f *1/02*
U.S. Cl. 330—9 8 Claims

ABSTRACT OF THE DISCLOSURE

A plurality of individual operational amplifier means are placed under similar environmental conditions such as having a common power supply and being exposed to the same ambient temperature. A fluctuation of such conditions produces a similar drift voltage in the output of each individual amplifier. One of the amplifiers is used as a corrective amplifier in which the output is fed back to its own second input and similarly to a second input of all the other individual amplifiers thereby reducing the zero point drift in each in proportion to the feedback factor.

Figure 1:
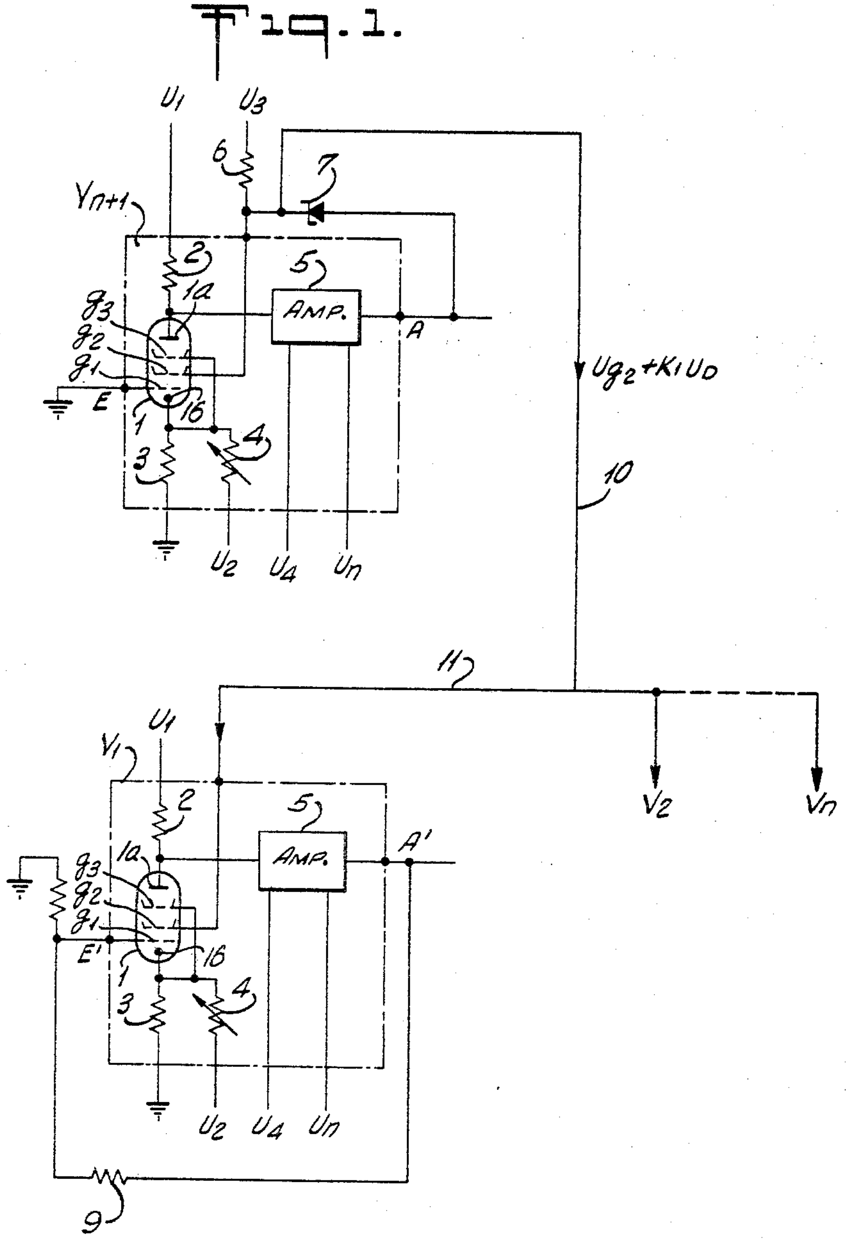

The invention relates generally to a circuit arrangement including a plurality of D-C amplifiers, and more particularly to a circuit arrangement with a plurality of identical D-C amplifiers which are preferably used in analog computers.

In order to sustain a relatively constant zero point in direct current amplifiers, much greater requirements are to be met than in A-C amplifiers, particularly with respect to the power supply of the amplifiers. Zero point drift in D-C amplifiers is caused mainly by two facts. One of these is inherently related to the internal structure of a D-C amplifier itself, such as the slow time varying character of the components, even if such variation remains within the limits guaranteed by the manufacturer. The other of these causes lies outside the amplifier per se, and it is mainly connected with time variations occurring in the power supply and with the effect on the amplifier of variations in the ambient temperature.

Due to the presence of such effects, a drift or interference voltage may be observed and, for purposes of calculation, referred back to the input of the amplifier. The drift voltage in amplifiers employing tube circuits is caused mainly by the fluctuations occurring in the power supplies accompanied by fluctuations in the filament supply. In semiconductor amplifiers the main cause of voltage drift may be traced back to the variations in the ambient temperature.

With respect to changes in the ambient temperature, transistorized D-C amplifiers are particularly sensitive, since such changes cause shifts in the position of the operating point of a transistorized amplifier unless known measures are provided for the stabilization of the operating point.

In order to offset the effect of the changes in the ambient temperature, in connection with transistorized amplifier devices, it has become a common practice to design the individual stages as differential stages, each of which comprises a pair of transistors having a common emitter resistor. It is important in this case, that both transistors have a similar temperature response, so that at the output of each transistor stage a shift of the operating point represents only a function of the difference between the temperature characteristics of the two transistors. Transistorized or tube circuits in D-C amplifiers are similarly sensitive to fluctuations in the power supply. To overcome these difficulties, known D-C amplifier constructions provide for a regulated power supply which is capable of supplying an operating voltage having a magnitude which is held to a maximum deviation of ±0.1%.

As has been pointed out above, tube circuits in D-C amplifiers are particularly sensitive to fluctuations in the filament voltage. For this reason, the filament voltage is frequently regulated or often the particular tube amplifier stage is designed in the form of a differential amplifier including two tubes in each stage with a common cathode resistor, in which arrangement the operating point shift may appear at the output of the differential stage as the function of the effect caused by the difference of the two different filament voltages.

It is also known that in cases where an unstable power supply is used, a D-C voltage is inserted at an appropriate point in the D-C amplifier circuit which varies proportionally to the power supply voltage, and which is to offset the effect caused by a drift of the zero point as a result of the fluctuations in the power supply.

In order to safeguard D-C amplifiers at the present state of the art from the the effects connected with zero point drift caused by fluctuations of the power supply and changes of the ambient temperature, a relatively large effort is required with respect to the power supply of the D-C amplifier. Since D-C amplifiers require at least two to three different supply voltages, and if such supply voltages should be electronically stabilized, it may happen that construction of an apparatus comprising only a few D-C amplifiers, will require the major effort to be expended in the provision of the regulated power supply. Despite the fact that analog computer units are available with only relatively few number of operational amplifiers therein, pure electronic analog computers at present find limited application, because of the unfavorable relation existing between the computing capability and the required power supplies, which circumstance renders them too expensive and still unreliable.

The above described zero point correction method using a proportionally varying D-C signal, has its limitations in that the correcting voltage may be taken from one of the supply sources by means of a voltage divider, the fluctuations of the other power supply sources, caused, for instance, by varying load conditions, cannot be accounted for. In most cases, the zero point drift of a D-C amplifier is not exactly proportional to the power supply fluctuations, so that the employing of a corrective voltage, proportional to the power supply voltage, will be effective for only a relatively small number of cases.

It is, therefore, an object of the present invention to provide an improved D-C amplifier or amplifier system, having a relatively small zero point drift and which does not require specially regulated power supplies and which does not exhibit extreme sensitivity to variations in the ambient temperature.

It is another object of the invention to provide a circuit arrangement, in which a plurality of D-C amplifiers are energized from a common power supply, and in which fluctuations in the power supply, or changes in the ambient temperature, have substantially no disturbing effect on the zero point of the amplifiers.

With these objects in view, the invention provides in a circuit arrangement, the combination of a plurality of operational D-C amplifiers having similar characteristics, and each comprising input and output means, and in which the amplifiers are exposed to conditions effecting generation of a drift voltage of substantially equal magnitude in each of the amplifiers. Also provided is a corrective network comprising a feed-back amplifier exposed to substantially the same conditions as each of the operational amplifiers, the feed-back amplifier producing an output signal which is correlated with the drift voltage in each of the operational amplifiers as referred to the respective input means thereof and means for coupling the output signal to the respective input means of each of the operational amplifiers so as to compensate the drift voltage in each of the operational amplifiers.

The invention provides that the output signal from the corrective network is fed to the respective input means of the operational amplifier at such polarity and magnitude, that it is capable of cancelling the drift signal which is referred to the respective input means of the operational amplifier.

The drift voltage developed in the D-C amplifiers, due to the effect of a plurality of disturbing conditions noted above, is referred back to the input of the respective amplifier or amplifier stage. It is noted, that in accordance with the invention, the circuit arrangement comprising the plurality of D-C amplifiers, should be constructed so that each amplifier has a similar circuit layout and is supplied from a common power supply. The amplifiers of the overall circuit arrangement should be disposed in close proximity with respect to each other, so that the ambient temperature can be regarded as being the same for all amplifiers.

It is obvious from the above that D-C amplifiers having the same characteristics will exhibit the same zero point drift under similar conditions, and the drift voltage developing in the amplifiers and referred back to the respective inputs thereof, will be substantially the same.

As noted above, in the apparatus containing a plurality of D-C operational amplifiers therein, an additional D-C amplifier is employed, in accordance with the invention, for correcting the drift or disturbing voltages occurring in the operational amplifiers. This additional amplifier is coupled to the respective inputs of the operational amplifiers by means of a reverse coupling network and in such a manner that a correcting voltage corresponding to the drift voltage multiplied by a factor which is a variable function of the reverse coupling, may be taken off at an appropriate point of the reverse coupling network. This correcting voltage is then simultaneously fed to all operational amplifiers to correct the drift voltage therein, the latter being referred to the inputs of the respective operational amplifiers or amplifier stage. The effect of the correcting voltage is such that the voltage appearing at the respective inputs of the operational amplifiers due to the corrective voltage, will be equal in magnitude and opposite in plurality to the original drift voltage. In each of the operational amplifiers, the sum of the drift and disturbing voltages, referred to the respective inputs of such amplifiers, will be zero in view of the corrective voltage.

In accordance with an aspect of the invention, the input of the additional reverse coupled feed-back amplifier or corrective amplifier is grounded and its output is returned through a Zener diode or a resistor to the screen grid of a pentode provided as an input stage, while the supply and the correcting voltages are led from a positively biased screen grid of the pentode to a screen grid of a respective similar pentode comprising the input stage in each of the operational amplifiers.

In accordance with another aspect of the invention, the zero point of each amplifier stage is adjustable with the help of a semiconductor device, such as a three-electrode transistor, serving as an input stage, in which the emitter electrode is connected to a voltage divider network. The additional or corrective amplifier in such an embodiment is itself coupled over two resistors between the output and input portions thereof, and is connected to the respective operational amplifiers through a further coupling resistor, across which the corrective voltage will appear, wherein the magnitude of the last-mentioned resistor is calculated so that the corrective voltage appearing thereacross will compensate the drift voltage referred to the respective inputs of the operational amplifiers.

In accordance with a further aspect of the invention, the transistors of all amplifiers, including the corrective amplifier, in the transistorized embodiment are arranged on a common metal support, and the power supplies comprise rectifiers arranged in circuit relationship with capacitors.

The circuit arrangement in accordance with the invention is effective not only in the elimination of the drift-effect due to slow variations in the power supply, it is also capable of offsetting the effect of rapid periodic variations in the event that the power supplies are directly fed from the capacitors without the inclusion of sufficient filtering equipment. The inventive circuit arrangement permits not only to obviate the need for specially designed power supplies, it permits also to obviate the need for filter stages in the rectifying units, so that the supply voltage may be directly taken across the capacitors of the rectifying circuits.

It has been observed in the past, that in the event of supplying a plurality of high-gain amplifiers from a common power supply, the amplifiers generate undesired oscillations over certain frequency ranges, when the self-impedance of the power supply reach a relatively high magnitude in such frequency ranges. In many applications, if the apparatus comprises a plurality of amplifier stages or amplifiers, the power supplies must be stabilized in order to attain a desired low self-impedance in certain frequency ranges.

The use of the inventive circuit arrangement eliminates the need for especially small self-impedances in the power supplies, since the voltage fluctuations due to the output current of the individual amplifier stages, or amplifiers, appearing on the self-impedances of the common power supplies, have no effect on the output voltages of the individual amplifying stages or amplifiers. Therefore, undesired mutual effects through the self-impedance of the power supplies are not possible.

Figure 2:
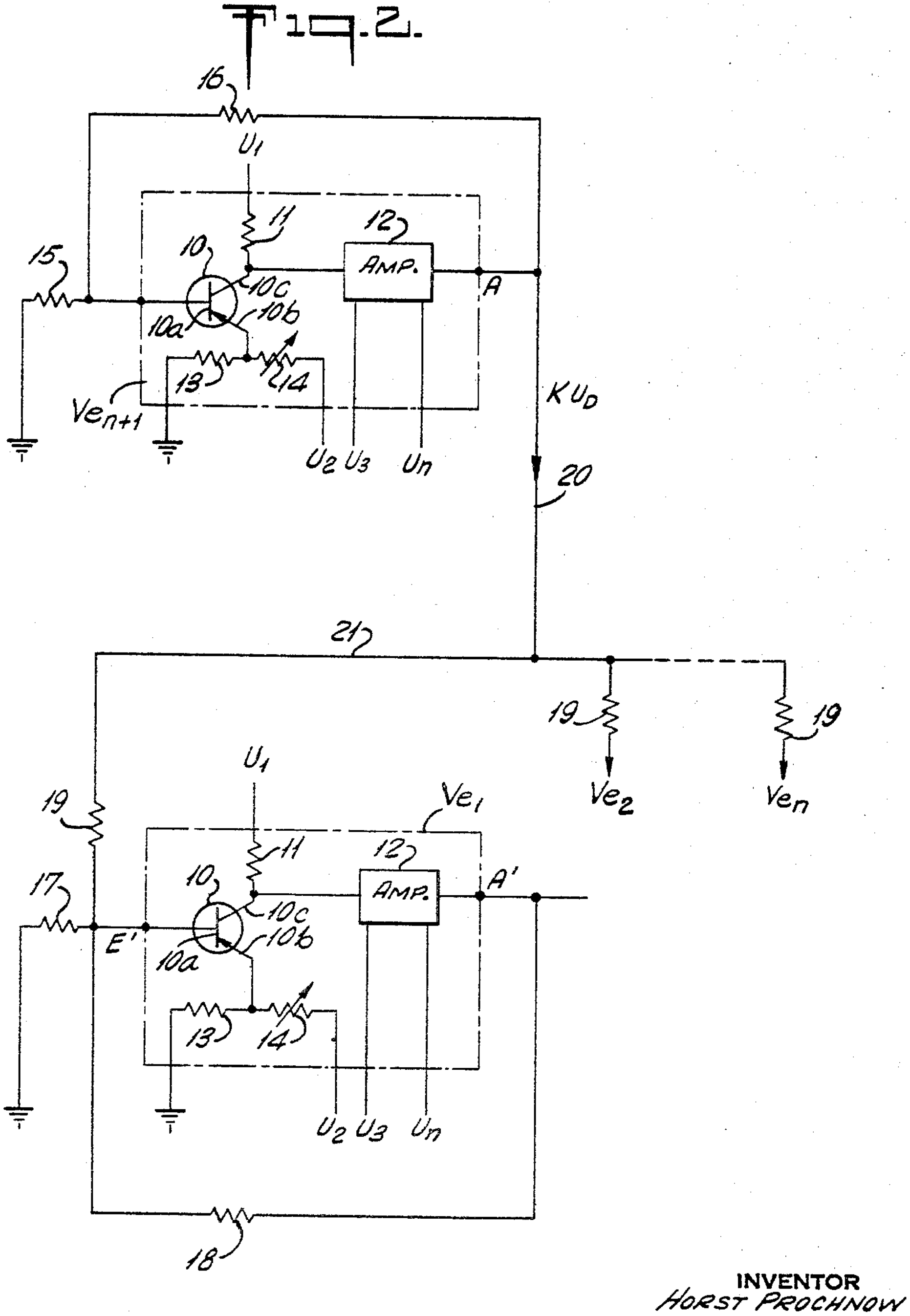

The invention will become more readily apparent from the following description of preferred embodiments thereof, shown in the accompanying drawings, in which:

FIG. 1 is an embodiment of the inventive circuit arrangement employing tube circuits; and FIG. 2 is another embodiment of the inventive circuit arrangement employing semiconductor circuits.

With reference to FIG. 1, it is seen that the circuit arrangement may include any number of operational amplifiers such as illustratively indicated by $V_1$ through $V_n$. The operational amplifiers $V_1$ to $V_n$ are of similar design and construction with respect to their component elements and are exposed to substantially the same operational conditions, such as ambient temperature, filament voltages, and power supply variations. An amplifier designated as $V_{n+1}$ is exposed to the same operational conditions as the operational amplifiers $V_1$ through $V_n$ and is arranged to supply a corrective voltage to the operational amplifiers in the manner hereinafter described, such corrective voltage offsetting the drift effect occurring in the operational amplifiers.

The corrective amplifier $V_{n+1}$ as pointed out above, is exposed to the same conditions as the operational amplifiers and comprises elements similar to those in the operational amplifiers. For illustrative purposes only, one amplifier of the operational amplifiers is shown, namely, amplifier $V_1$, in which like elements are designated by the same reference characters as in the corrective amplifier $V_{n+1}$.

Each amplifier $V_1$ through $V_{n+1}$ includes an input device which is a pentode 1 in the particular embodiment, having an input electrode E. The plate 1*a* of pentode 1 is supplied with plate voltage from a power supply $U_1$ through resistor 2. A cathode circuit includes cathode 1*b* of the pentode which cathode is returned to ground through a resistor 3. Screen grid $g_3$ of the pentode is returned to the abovementioned cathode circuit, which circuit in addition to cathode resistor 3 includes a variable resistor 4 which in turn is returned to a voltage supply source $U_2$. With the help of variable resistor 4, the desired zero point of the associated amplifier may be adjusted.

The plate circuit of each pentode 1 is coupled to the respective subsequent amplifying stage contained in the box generally designated as 5, which in every stage is supplied from common power supplies designated by $U_3 \ldots U_n$. The output of the operational amplifiers designated as A′ is returned to the input of the respective amplifier by feed-back impedances 8 and 9 in a countercoupled manner, feedback impedance 8 being returned to ground.

In the corrective amplifier stage $V_{n+1}$ screen electrode $g_2$ of pentode 1 is returned to a source of potential $U_3$ through resistor 6 whereas the output A in this particular amplifier is returned to screen grid $g_2$ through a Zener diode 7, connected with its negative pole to output A of the amplifier stage, whereas the positive pole of Zener diode 7 is connected to a circuit portion between resistor 6 and grid $g_2$. The positive pole of Zener diode 7 is returned by a lead 10 to a common lead 11 connected to the respective grids $g_2$ of the operational amplifiers $V_1$ through $V_n$. The corrective amplifier $V_{n+1}$ is returned to the respective screen grids $g_2$ of the operational amplifiers serving as second input means for the corrective signal such that a counter-coupling effect is achieved at the respective screen grids of the operational amplifiers.

Since all amplifiers $V_1$ to $V_{n+1}$ are exposed to the same operational conditions as above noted, a similar drift voltage will develop in each amplifier (due to fluctuations in the power supplies and ambient temperature conditions), which is then referred back to the input of the corrective amplifiers as a voltage having the magnitude $U_D$. In virtue of the amplification effect of grid $g_2$, grid $g_2$ will have a voltage developed thereon designated $K_1U_D$, in which expression the factor $K_1$ represents the screen grid amplification factor of pentode 1 which is expressable by the relation $U_{g2}/g_1$.

The voltage $K_1U_D$ developed in corrective amplifier $V_{n+1}$ on the grid $g_2$ thereof, is returned through the abovementioned leads 10, 11 to the respective grids $g_2$ of the operational amplifiers $V_1$–$V_n$ in a counter-coupled manner. Such corrective voltage from corrective amplifier $V_{n+1}$ will effect the elimination of the drift voltages developed in the operational amplifiers.

FIG. 2 shows another embodiment of the invention, employing semiconductor devices as input devices in the amplifiers. Operational amplifiers $V_{e1}$ through $V_{en}$, of which only $V_{e1}$ is shown for illustrative purposes, are of the same design and comprise substantially similar components. The amplifier $V_{en+1}$, which is the corrective amplifier in accordance with the invention, will have in its amplifier section the same elements as the amplifier sections of the operational amplifiers of the circuit arrangement. The amplifier section in each amplifier comprises a transistor 10 having base 10*a*, emitter 10*b*, and collector 10*c* electrodes. The base electrode 16*a* in the illustrated embodiment serves as the input E or E′ of the respective amplifier stage and is connected to ground by a resistor 17 in the operational amplifiers $V_{e1}$ through $V_{en}$ and through a resistor 15 in the corrective stage $V_{en+1}$ respectively. The emitter electrode 10*b* of the transistors 10, in each stage, is returned to a voltage divider circuit comprising a resistor 13 returned to ground and a variable resistor 14 returned to a source of potential $U_2$, the latter variable resistor serving to adjust the zero point of the respective stage. Collector electrode 10*c* of each transistor 10 is returned to a source of potential $U_1$ through a collector resistor 11. The collector electrode 10*c* is also coupled to the subsequent amplifier stages designated by a box 12 which may comprise any number of amplifier stages having common supply sources such as $U_3$ through $U_n$. The output A′ of the basic amplifier in the operational amplifiers $V_{e1}$ through $V_{en}$ is returned in a countercoupled manner through feedback impedances 17, 18 to the input E′ of the respective amplifier. The output A of the corrective amplifier $V_{en+1}$ is returned in a countercoupled manner to the input E thereof through feedback impedances 15, 16. The output A of the corrective stage is also fed in a countercoupled manner through lead 20 to a common lead 21 to operational amplifiers $V_{e1}$ through $V_{en}$, the common lead 21 being returned to the respective input portions of the operational amplifiers by a resistor 19. Corrective amplifiers $V_{en+1}$ develops a drift voltage $U_D$ which is referred back to the input of corrective amplifier $V_{en+1}$ and multiplied by factor K which is determined by impedances 15, 16. The corrective voltage $KU_D$ developed in the corrective amplifier $V_{en+1}$, wherein K is the amplification factor of the corrective amplifier, is coupled to the above-mentioned leads 20, 21 to the respective input of the operational amplifiers in a countercoupled fashion such that the drift voltage developed in the operational amplifiers and referred to the input E′ thereof will be compensated by the corrective voltage coming from corrective amplifier $V_{en+1}$. The magnitude of feedback resistor 19 is correlated with the value of feedback impedances 17 and 18 in such a manner that cancellation of the drift voltage occurs at the respective input portion of the operational amplifiers.

The input transistors 10 of each amplifier of the operational amplifiers $V_{e1}$ through $V_{en}$, and that of the corrective amplifier $V_{en+1}$ are mounted on a common metal block (not shown), in order to provide substantially identical temperature conditions for all input transistors of the circuit arrangement.

What I claim is:

1. In a circuit arrangement, the combination of a plurality of operational amplifier means having similar characteristics, each of said amplifiers being exposed to drift conditions such as fluctuations of common power supplies or fluctuations of common ambient temperature, such drift conditions producing a drift voltage of substantially equal magnitude in each of said amplifier means, each of said amplifier means having a first input means for a signal voltage, a second input means for a corrective voltage, and an output means, one of said operational amplifier means constituting a corrective amplifier means exposed to the same conditions as each of said operational amplifier means and having said first input means thereof returned to ground, feedback means for coupling said output means of said corrective amplifier means to the respective second input means of each of said operational amplifier means and to the second input means of said corrective amplifier means such as to compensate said drift voltage in each of said operational amplifier means, whereby the zero point drift in each of said amplifier means is reduced in proportion to the feedback factor of said feedback means.

2. The combination as claimed in claim 1 wherein said feedback means includes a Zener diode.

3. The combination as claimed in claim 1, wherein each of said amplifier means comprises a pentode.

4. The combination as claimed in claim 3, wherein said feedback means includes resistor means.

5. The combination as claimed in claim 3, wherein said pentode includes a cathode circuit, a voltage dividing network comprising adjustable resistor connected to said cathode circuit for adjusting the zero point of the associated amplifier means.

6. The combination as claimed in claim 1, wherein said plurality of operational amplifier means are substantially identical as to the component elements thereof, and further including a common power supply means for supplying power to each of said operational amplifier means and for said corrective amplifier means.

7. The combination as claimed in claim 1, wherein each of said amplifier means comprises a semi-conductor device.

8. The combination as claimed in claim 7, wherein said corrective amplifier means and said operational amplifier means comprise identical semiconductor devices.

References Cited

UNITED STATES PATENTS

| | | | |
|---|---|---|---|
| 3,137,825 | 6/1964 | Haner | 330—9 X |
| 3,167,718 | 1/1965 | Davis et al. | 330—9 X |
| 3,237,117 | 2/1966 | Collings et al. | 330—9 |

NATHAN KAUFMAN, *Primary Examiner.*

U.S. Cl. X.R.

330—3, 17